United States Patent [19]

Netzer

[11] Patent Number: 4,547,209
[45] Date of Patent: Oct. 15, 1985

[54] CARBON DIOXIDE HYDROCARBONS SEPARATION PROCESS UTILIZING LIQUID-LIQUID EXTRACTION

[75] Inventor: David Netzer, Houston, Tex.

[73] Assignee: The Randall Corporation, Houston, Tex.

[21] Appl. No.: 635,786

[22] Filed: Jul. 30, 1984

Related U.S. Application Data

[63] Continuation-in-part of Ser. No. 583,467, Feb. 24, 1984, abandoned.

[51] Int. Cl.⁴ ............................................. F25J 3/00
[52] U.S. Cl. ................................. 62/17; 62/20; 62/24; 62/28; 55/56; 203/43; 208/311
[58] Field of Search .............. 62/24, 17, 27, 28, 23, 62/20, 31; 203/43; 55/37, 56, 68; 208/311, 324; 585/868

[56] References Cited

U.S. PATENT DOCUMENTS

| | | | |
|---|---|---|---|
| 3,010,286 | 11/1961 | Baker et al. | 62/17 |
| 3,977,203 | 8/1976 | Hinton et al. | 62/17 |
| 4,311,495 | 1/1982 | Styring, Jr. | 62/17 |
| 4,374,657 | 2/1983 | Schendel et al. | 62/28 |

Primary Examiner—S. Leon Bashore
Assistant Examiner—Andrew J. Anderson
Attorney, Agent, or Firm—Richard H. Berneike

[57] ABSTRACT

Carbon dioxide is cryogenically separated from methane and then is separated from the ethane by liquid extraction with water at high pressures of 500 to 2250 psia thus avoiding the $CO_2$—$C_2H_6$ azeotrope problem. The process is particularly applicable to the recovery of high pressure pure carbon dioxide from the wellhead products of carbon dioxide flooding used in enhanced oil recovery. The high pressure pure carbon dioxide liquid is pumped for reinjection to the well.

11 Claims, 2 Drawing Figures

CARBON DIOXIDE HYDROCARBONS SEPARATION PROCESS UTILIZING LIQUID-LIQUID EXTRACTION

BACKGROUND OF THE INVENTION

This application is a continuation-in-part of Application Ser. No. 583,467, filed Feb. 24, 1984, now abandoned.

The present invention relates to the extraction of $CO_2$ from ethane and other light hydrocarbons by liquid extraction at high pressure. The invention is particularly applicable to carbon dioxide flooding projects for enhanced oil recovery, however it is valuable in other situations where high pressure $CO_2$ is a major plant product.

In $CO_2$ flooding projects for enhanced oil recovery, $CO_2$ is injected into the formation at a typical pressure range of 1,000–3,000 psia. The affect of the pressure along with the miscibility of $CO_2$ in the oil in the reservoir results in the additional production of oil. Usually about 6,000–18,000 SCF of $CO_2$ are required for recovery of one barrel of oil.

For an initial period of time, there is little or no $CO_2$ exiting the wellhead with the oil. However, after this $CO_2$ breakthrough period which may commonly occur six months to thirty months after the initiation of the flood, about 50-80% of the injected $CO_2$ breaks through the reservoir and exits the wellhead at low pressure, along with hydrocarbon products. The balance of the $CO_2$ dissipates in the formation and is not recoverable. Recovery of the wellhead $CO_2$ is an essential factor to make the enhanced oil recovery by $CO_2$ flood an economical operation. A typical gas composition after this $CO_2$ breakthrough may be commonly in the following range:

|        | Mol % |
|--------|-------|
| $CO_2$   | 60-90 |
| $H_2S$   | 0-3   |
| $CH_4$   | 8-15  |
| $C_2H_6$ | 5-10  |
| $C_3H_8$ | 3-6   |
| $C_4+$   | 2-5   |
| $N_2$    | 0-2   |

After the breakthrough, the $CO_2$ content may increase gradually with time and the hydrocarbon content may decrease at a moderate rate as the reservoir is depleted. When the reservoir is abandoned (say, after approximately ten years), the $CO_2$ content may exceed 90%.

The $CO_2$ separation is required since the $CO_2$ is a valuable fluid for injection into the reservoir thus reducing the $CO_2$ makeup rate. Also, the separation produces valuable sales gas and liquid hydrocarbons products.

The specifications for the reinjected $CO_2$ are a function of the reservoir characteristics but a common specification range is as follows:

1. $CO_2$ injection pressure: 1,000–3,000 psia
2. $CO_2$ purity: >90%
3. $H_2S$ content: <100 ppm Usually higher $CO_2$ purity results in higher yield of liquid and gas products. For example, typical specifications for a sales gas are:

1. Methane content: >90%
2. $CO_2$ content: <5%
3. Sulfur ($H_2S$, $CS_2$, COS): <4 ppm
4. Pressure: 500–1,200 psia
5. Higher heat value: >950/Btu/scf There are several major prior art approaches for the separation recoveries of $CO_2$ and hydrocarbons. One is the amine or other alkaline scrubbing of $CO_2$ at 100–400 psia and a combination of pressure and temperature swing for the regeneration of the $CO_2$. This system requires relatively high heat energy for the chemical breakdown to regenerate the $CO_2$ and energy to recompress the $CO_2$ to reinjection pressure. Another system is membrane separation at pressures of 300–1,000 psia where the bulk of the $CO_2$ containing small but still undesirable portions of hydrocarbons are recovered as permeate at pressures of about 30–100 psia and then recompressed for reinjection. There is a large pressure drop and thus high energy for $CO_2$ recompression.

A third system is the use of a physical solvent such as Selexol where $CO_2$ and $H_2S$ along with some hydrocarbons are absorbed at pressure of 200–800 psia. A portion of the $CO_2$ can be recovered at pressure of about 50–100 psia while the balance of it is recovered at atmospheric pressure. The $CO_2$ is then recompressed to the injection pressure which again requires considerable energy. Also, the fact that considerable portions of the hydrocarbons are absorbed in the physical solvent is a drawback. Another system is cryogenic distillation where a liquid $CO_2$ is separated from hydrocarbons at pressure range of 250-550 psia, where $H_2S$ is either absorbed upstream selectively to $CO_2$ by amine solution (such as M.D.E.A.) or cryogenically separated with the $C_3+$ products.

One of the potential obstacles which may be encountered in the fractionation of $CO_2$ and hydrocarbons is $CO_2$ freezing occuring at about $-70°$ F. This freezing could occur in the $CH_4$—$CO_2$ separation column. The second obstacle is the $CO_2/C_2H_6$ azeotrope formation, (that for a binary system would be about 70 mol % $CO_2$ and 30 mol % $C_2H_6$) which makes it difficult to separate $C_2H_6$ from $CO_2$.

These problems have been solved in the past by injection of $C_4+$ hydrocarbon into the feed gas. The $C_4+$ increases the relative volatility of $CO_2$ over $C_2H_6$. The $C_4+$ also suppresses $CO_2$ freezing, thus allowing $CO_2$—$CH_4$ fractionation at low temperatures. This process technology is provided by Koch Process Systems and is known as the Ryan Holmes process.

Another approach has been proposed by Fluor Corporation in which $CO_2$—$C_2H_6$ separation is carried out by a membrane which is preceded by a cryogenic demethanizer using the Ryan Holmes process mentioned above. The $CO_2$ permeate has to be recompressed to the well injection pressure.

SUMMARY OF THE INVENTION

The present invention relates to the cryogenic separation of $CO_2$ from light hydrocarbons and has for an object the separation of $CO_2$ from $C_2H_6$ and other light hydrocarbons. More specifically, the separation is by liquid extraction at high pressure thus avoiding the $CO_2$—$C_2H_6$ azeotrope problem and providing pressurized $CO_2$.

DESCRIPTION OF THE PREFERRED EMBODIMENT

Figure 1:
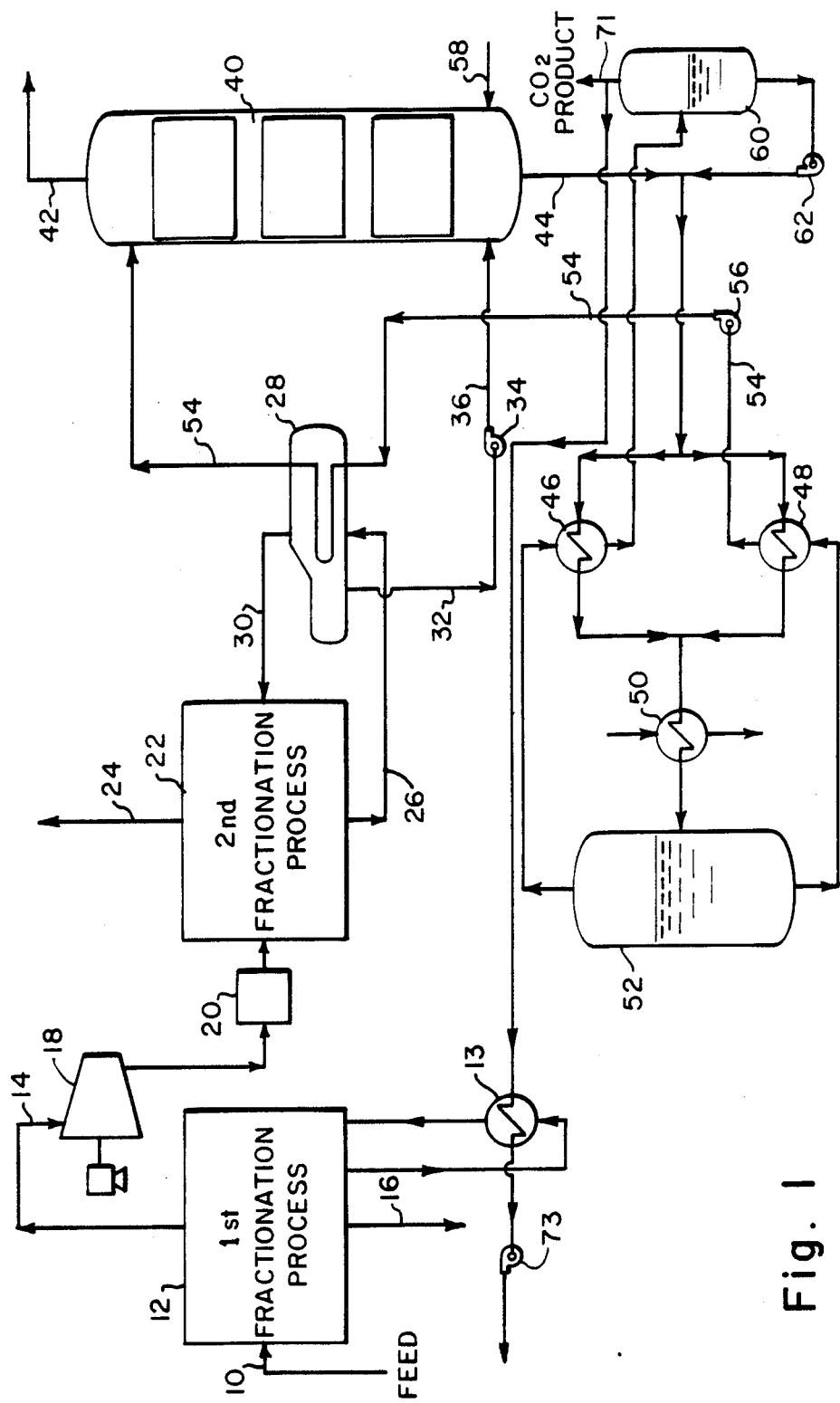
FIG. 1 is a flow diagram of the present invention.

The gas mixture from the well containing the $CO_2$ and light hydrocarbons as well as $H_2S$ is compressed and delivered to the battery limit at about 250–400 psia and then undergoes dehydration if necessary by conventional drying systems such as triethylene glycol or molecular sieves. The following composition and process conditions for the feed gas 10 in FIG. 1 have been used herein to illustrate the invention and to generate a consistent heat and material balance:

TABLE 1

|  | Mol % |
|---|---|
| $CO_2$ | 70.16 |
| $H_2S$ | 1.20 |
| $CH_4$ | 12.22 |
| $C_2H_6$ | 6.71 |
| $C_3H_8$ | 5.23 |
| $iC_4$ | 1.07 |
| $nC_4$ | 2.09 |
| $iC_5$ | 0.49 |
| $nC_5$ | 0.27 |
| $C_6^+$ | 0.12 |
| $N_2$ | 0.44 |
| Flow Rate: | 50 MMSCFD |
| Pressure: | 335 psia |
| Temperature, °F: | 105 |
| Total Gas Flow: | 5,590 lb. mol/hr |

The feed gas 10 is introduced into the distillation system indicated symbolically at 12 including a reboiler 13 where essentially all the $CH_4$, 97–98% of the $CO_2$ and about 95% of the $C_2H_6$ will be recovered as an overhead vapor product 14. About 5% of the $C_2H_6$ and about 99% of all the $H_2S$ and essentially all the $C_3+$ are separated as a liquid bottom product 16. The criteria for the $H_2S$ separation is a limit of 100 mol ppm $H_2S$ in the $CO_2$ product downstream. Considering the specific feed gas composition given above, the yield from the distillation system 12 are as follows:

TABLE II

| Composition | Top Product (14) Lb. Mol/Hr | Bottom Product (16) Lb. Mol/Hr |
|---|---|---|
| $CO_2$ | 3,751.3 | 100.15 |
| $H_2S$ | 0.395 | 65.46 |
| $CH_4$ | 670.9 | Trace |
| $C_2H_6$ | 352.50 | 15.88 |
| $C_3H_8$ | 0.48 | 287.00 |
| $iC_4$ | Trace | 58.73 |
| $nC_4$ | Trace | 114.71 |
| $nC_5$ | Trace | 41.71 |
| $C_6^+$ | Trace | 6.586 |
| $N_2$ | 24.16 | Trace |
| Total | 1,044.84 | 3,754.7 |

The bottom product 16 from the fractionation system 12 is routed to sour gas processing where the various components may be recovered as desired. The overhead vapor product 14 from the fractionation system 12 will be at a pressure of about 325 psia and −9° F. This vapor product is compressed to 580 psia in the compressor 18. This compressed gas at 68° F. is then cooled in the refrigeration system 20 to −9° F. which condenses a large portion of the gas. This cooled gas/liquid mixture at −9° F. is then fed to the fractionation system 22. In the fractionation system 22, about 92% of the $CO_2$ is recovered at the bottom along with about 87% of the $C_2H_6$. The overhead vapor product contains $CH_4$ with about 30% $CO_2$ and about 4% $C_2H_6$. By allowing this residual quantity of $CO_2$ to remain in the overhead gas, $CO_2$ freezing problems in the system can be avoided and the refrigeration system can be simplified by avoiding vacuum conditions or a cascade refrigeration system. The yields from this fractionation system 22 based upon the previous feed conditions are as follows:

TABLE III

| Composition | Top Vapor Product Lb. Mol/Hr (24) | Bottom Liquid Product Lb. Mol/Hr (32) |
|---|---|---|
| $CO_2$ | 310.0 | 3,441.60 |
| $H_2S$ | 0.0114 | 0.3839 |
| $CH_4$ | 664.88 | 6.04 |
| $C_2H_6$ | 45.80 | 306.70 |
| $C_3H_8$ | Trace | 0.0473 |
| $C_4^+$ | Trace | Trace |
| $N_2$ | 24.16 | Trace |
| Total | 1,044.84 | 3,754.7 |

The overhead gas 24 from the fractionation system 22 is then fed to a selected conventional process such as amine or Selexol for gas purification and residual $CO_2$ recovery (not shown). This gas can also be used as a plant fuel gas.

The bottom product 26 from the fractionation system 22 is passed to the reboiler 28 where it is heated by the water recycle stream to the extraction column as will be discussed further hereinafter. A portion of this heated bottom product is recycled to the fractionation system 22 through line 30 while the remainder is discharged through line 32 at a temperature of about 37° F. and a pressure of 568 psia. This stream is then pumped at 34 to a pressure of about 500 to about 2250 psia. The entire extraction and regeneration can be performed at the higher pressures over 2000 psia with no need for further recompression of the $CO_2$ for reinjection. Although the extraction efficiency of the $CO_2$ i.e., the equilibrium of the $CO_2$ between the water and organic phases is enhanced by increased pressure, extraction at the lower end of this pressure range is more feasible from a practical equipment design standpoint and a pressure of 850 psia will be used for further illustration. This pressure is suitable either for liquification of the $CO_2$ at about 60° F. (using the reboiler of system 12 as a source of refrigeration) or for reinjection with minimal recompression. This pressurized stream 36 in the example has a composition of 92 mol %, $CO_2$ and 8 mol % $C_2H_6$.

This stream 36 is injected in the bottom section of the extraction column 40 which may be any desired type such as a tray of a packed column. In the column, the concept is the use of high pressure water circulation to extract the $CO_2$ from the $C_2H_6$ in a liquid phase. This is accomplished by injecting a water phase lean in $CO_2$ (about 1.5-2 wt. %) and about 55°-75° F. at the top of the column thus forming a continuous water phase which flows down in the column and a light dispersed liquid organic phase which rises through the column. This counter-current phase flow through the column causes mass transfer of $CO_2$ from the dispersed organic phase to the water phase. About 95-98% of the $CO_2$ is extracted and the balance remains in the ethane phase. The counter-current vertical flow is maintained because of the significant density difference between the phases.

The top product 42 from the extraction column 40 has a composition of about 74 mol % $C_2H_6$ and 25 mol % $CO_2$ with less than 0.2 mol % of $H_2O$. This product stream 42 may be sent for further processing as will be further discussed. The bottom product stream 44 has a $CO_2$ content of 5-7 wt. % $CO_2$ and less than 100 mol ppm of $C_2H_6$.

The bottom product, water phase stream 44 is then split and fed to heat exchangers 46 and 48. Any additional heat necessary to raise the temperature to about 230°-270° F. is supplied by trim heater 50. This heated stream is then fed to the separator 52 where separation of $CO_2$ occurs. About 70% of the dissolved $CO_2$ is separated at a pressure of about 800 psia. This $CO_2$ supercritical dense gas phase with small quantities of $H_2O$ is cooled to 105° F. by the bottom product in heat exchanger 46. The water phase from the separator 52 is lean in $CO_2$ (about 1.5-2 wt. %) and is cooled to 67° F. in the heat exchanger 48.

This stream 54 from heat exchanger 48 is cooled further to 55°-60° F. in the reboiler 28 where heat is given up by the water phase to the bottom product from the fractionation system 22. Additional refrigeration of the stream 54 may be provided if needed. This stream 54 is then injected into the top portion of the extraction column 40. The pump 56 supplies the water circulation power with pressure drop of about 100 psi.

The $CO_2$ gas phase with small quantities of $H_2O$ from the separator 52 is cooled to about 105° F. in heat exchanger 46 which condenses the water along with a small quantity of $CO_2$. This product then goes to separator 60 where the $H_2O$ is separated from the $CO_2$. The $CO_2$ gas at 800 psia may then be dried if necessary by a conventional system such as glycol and is ready for liquification for storage or recompression for reinjection into the formation. The liquification temperature of this $CO_2$ is about 60° F. and the reboiler 13 of system 12 may be used as a source of cold for this liquification. The liquified $CO_2$ is boosted to reinjection pressure by pump 73 or sent to storage via line 71. The water phase from the separator 60 is rich in $CO_2$ and is pumped at 62 back up to pressure into the water phase from the bottom of the extraction for recycle through the $CO_2$ separation system.

Since there is some small water loss in the system, make up water is added at 58 to the extraction tower 40. For corrosion consideration, the chlorine content of the circulating water should be very low, preferably below 150 wt. ppm.

Figure 2:
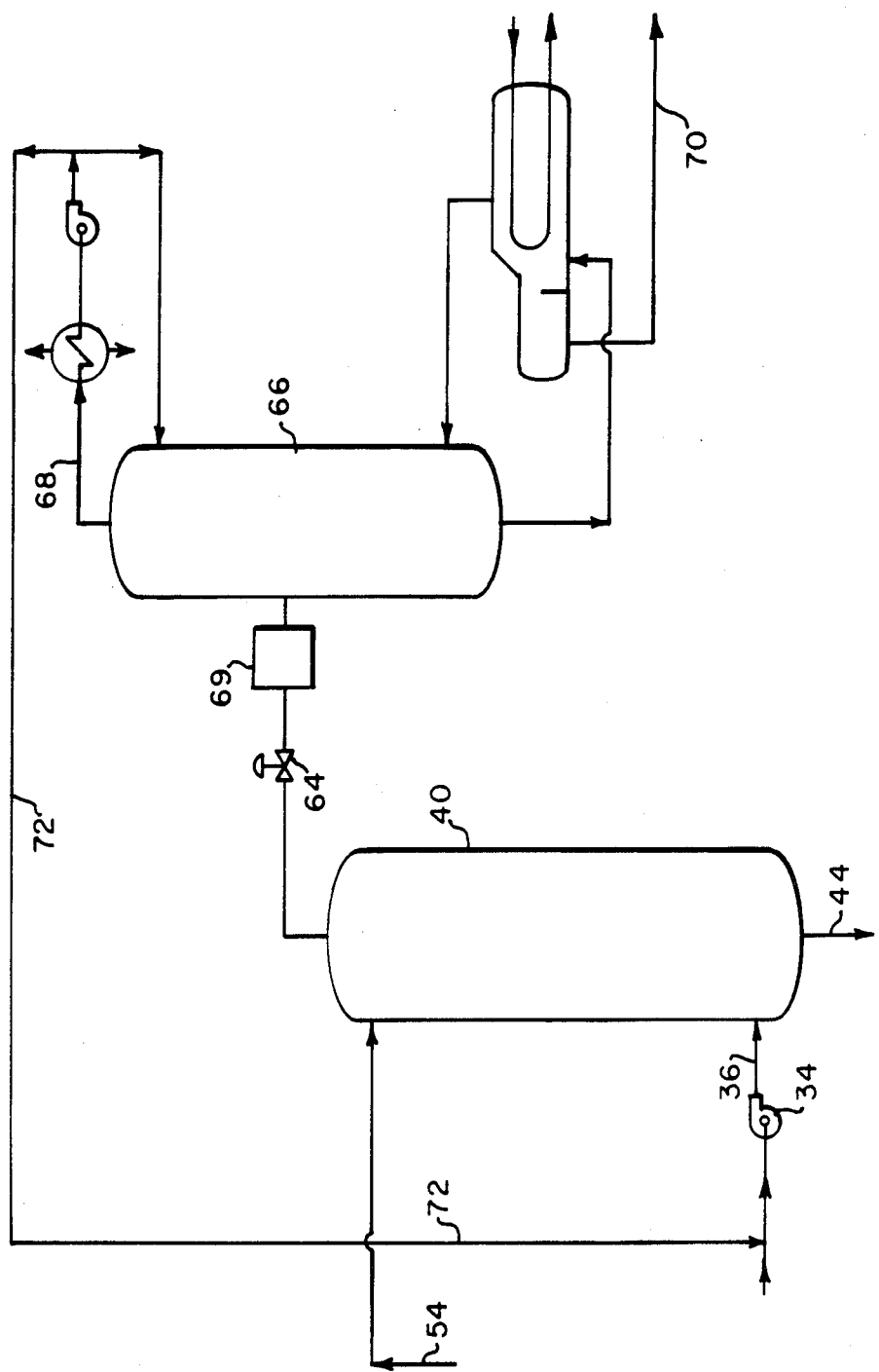
FIG. 2 is a flow diagram of a modification of the invention.

FIG. 2 illustrates an alternative arrangement of the present invention and involves the purification of the top product from the extraction column 40. This top product, which is a liquid containing 25-35 mol % $CO_2$ and 65-74 mol % $C_2H_6$ with only traces of water and $CH_4$ at a temperature of 55°-60° F. and a pressure of 800 psia, is expanded through valve 64 to a pressure of 550 psia. This stream is then introduced into the fractionation column 66 which includes conventional liquid drying system 69 such as silica gel. Since $C_2H_6$ and $CO_2$ form an azeotrope at about 70 mol % $CO_2$, the top product 68 from column 66 approaches the azeotrope reaching about 66 mol % $CO_2$. The bottom product 70 from the fractionation system is about 99 mol % $C_2H_6$. The top product 68 is cooled and then part is returned to the column as reflux with the remainder 72 being pumped back as additional feed to the extraction column 40. The effect of this azeotrope recycle on the extraction system is an increase in the water flow rates of about 7-10% with all other factors remaining the same.

A further feature or modification of the invention is that the water used for extraction in column 40 may be a mixture of water and a water soluble organic solvent with a low affinity for ethane and a high affinity for $CO_2$ such as methanol. In such a case, the methanol remains in the water phase. The solubility of $CO_2$ in methanol is several times as great as the solubility in water. However, ethane is also somewhat soluble in methanol. Therefore, up to 35 mol % methanol may be used which will significantly increase the solubility of the carbon dioxide but will not greatly increase the ethane loss. For example, using 15 mol % methanol in the water may increase $CO_2$ solubility by about 40%. While the ethane solubility will also increase, this increase may be on the order of from about 100 mol ppm to about 300 mol ppm which still amounts to a low ethane loss. The effect of the use of this mixture of water and methanol is that the circulation rate of the water phase through the extraction column may be 80% or less of what it would otherwise be. Methanol will also reduce the hydrate formation temperature and the extraction pressure can be reduced to 500 psia.

Although the specific example which has been given utilizes an extraction pressure of 850 psia, this pressure may vary depending upon the composition being treated and the local conditions for deliverying $CO_2$. The preferred lower limit for the pressure of the extraction process is about 700 psia to avoid hydrate formation which occurs at about 52° F. unless the water soluble organic solvent is added in which case the pressure can be reduced to about 500 psia with subsequent reduction in temperature as previously explained.

The advantage of the present invention is that there is a high recovery of hydrocarbons and pure $CO_2$ at a relatively high pressure and at a relatively low energy cost. While preferred embodiments and uses of the present invention have been shown and described, changes may be made within the scope of the invention as claimed.

I claim:

1. A liquid phase process for the extraction and recovery of $CO_2$ from a liquid mixture of $CO_2$ and light hydrocarbons containing at least 60 mol % $CO_2$ and ethane as the major light hydrocarbon component, said liquid mixture being at a high pressure of at least 500 and up to 2250 psia comprising the steps of:
   (a) introducing said liquid mixture at said high pressure into the lower portion of an extraction system,
   (b) introducing a liquid water phase containing at least 65 mol % water and lean in $CO_2$ at said high pressure into the top portion of said extraction system whereby said water phase will flow downwardly and said liquid mixture will flow upwardly in contact with said water phase such that said water phase will extract $CO_2$ from said liquid mixture,
   (c) withdrawing said liquid mixture depleted in $CO_2$ from the top portion of said extraction system,
   (d) withdrawing said water phase rich in $CO_2$ from the bottom portion of said extraction system,
   (e) separating said withdrawn water phase into $CO_2$ gas and water, and
   (f) recycling said separated water to the top portion of said extraction system.

2. The process of claim 1 wherein said separating step (e) comprises heating said withdrawn water phase without any substantial pressure reduction and flashing said $CO_2$ from said water and recovering $CO_2$ at a high pressure.

3. The process of claim 2 wherein said heating at least partially comprises transferring heat from said separated water and said separated $CO_2$ gas to said withdrawn water phase rich in $CO_2$.

4. The process of claim 3 wherein the step of transferring heat from said separated $CO_2$ condenses water from said separated $CO_2$ gas and further including the step of separating the remaining $CO_2$ from said condensed water.

5. The process of claim 4 wherein said separated condensed water is recycled to said water phase rich in $CO_2$ withdrawn from the bottom portion of said extraction system.

6. The process of claim 3 wherein said separated water is further cooled by transferring heat to said liquid mixture feed to said extraction system.

7. The process of claim 1 wherein said liquid mixture depleted in $CO_2$ withdrawn from the top portion of said extraction system is further treated comprising the steps of:

(a) reducing the pressure and drying, (b) fractionating said liquid mixture depleted in $CO_2$ whereby a relatively pure ethane is recovered at the bottom and a mixture of ethane and $CO_2$ approaching the azeotrope composition is recovered at the top, and (c) recycling said mixture of ethane and $CO_2$ recovered at the top to said extraction system along with said liquid mixture.

8. The process of claim 1 wherein said liquid water phase includes up to 35 mol % of water soluble organic solvents with a low affinity for ethane and a high affinity for $CO_2$.

9. The process of claim 8 wherein said water soluble organic solvent is methanol.

10. The process of claim 1 wherein said high pressure is at least 700 psia.

11. The process of claim 1 wherein said liquid water phase introduced into the top portion of said extraction system is at a temperature of from 55° to 75° F.

* * * * *